US012581139B2

(12) United States Patent
Pogosian

(10) Patent No.: US 12,581,139 B2
(45) Date of Patent: Mar. 17, 2026

(54) RESTAURANT SERVICE WITH OPEN VIDEO SURVEILLANCE DURING THE ORDER COOKING AND DELIVERY

(71) Applicant: Semyon Pogosian, Yerevan (AM)

(72) Inventor: Semyon Pogosian, Yerevan (AM)

( * ) Notice: Subject to any disclaimer, the term of this patent is extended or adjusted under 35 U.S.C. 154(b) by 0 days.

(21) Appl. No.: 18/780,975

(22) Filed: Jul. 23, 2024

(65) Prior Publication Data

US 2026/0032292 A1     Jan. 29, 2026

(51) Int. Cl.
| | |
|---|---|
| *H04N 21/2187* | (2011.01) |
| *G06Q 50/12* | (2012.01) |
| *H04N 21/258* | (2011.01) |

(52) U.S. Cl.
CPC ......... *H04N 21/2187* (2013.01); *G06Q 50/12* (2013.01); *H04N 21/25816* (2013.01)

(58) Field of Classification Search
CPC ......... H04N 21/2187; H04N 21/25816; G06Q 50/12
USPC ....................................................... 348/143
See application file for complete search history.

(56) References Cited

U.S. PATENT DOCUMENTS

2024/0119393 A1* 4/2024 Schwenker ........ G06Q 30/0635
2024/0127318 A1* 4/2024 Edison ................... G06Q 50/12

OTHER PUBLICATIONS

English Translation of Korean Publication KR20200033408 Mar. 2020 (Year: 2020).*
English Translation of Korean Publication KR102051464 Dec. 2019 (Year: 2019).*

* cited by examiner

*Primary Examiner* — Loi H Tran
(74) *Attorney, Agent, or Firm* — Bardmesser Law Group

(57) ABSTRACT

Invention relates to the public catering sphere, and allows users in remote mode/in real time to monitor cooking and moving dishes and at the same time to have high speed, secure and precise information processing that in aggregate increases productivity and creating a ground taking into account the constantly increasing volumes of processed data. The restaurant service includes formation of a food order, selection of a certain dish, adding the ordered one for approval, specifying the delivery address, choosing a payment method and then completing the order. In the client application software it is possible to turn on video cameras installed with ability to broadcast cooking processes in real time. Transition to execution of the incoming orders is approved by the hardware operator of the software and hardware system containing a cluster of web servers and database servers, in a common server of software applications interacting with client software applications.

17 Claims, 7 Drawing Sheets

RESTAURANT SERVICE WITH OPEN VIDEO SURVEILLANCE DURING THE ORDER COOKING AND DELIVERY

BACKGROUND OF THE INVENTION

Field of the Invention

The proposed invention referred to the public catering sphere and namely to an automated data processing technology that combines the possibilities of ordering the selected products in remote mode and video viewing in real time of the product cooking stages and its possible movement into an agreed place of delivery.

Background of the Related Art

According to statistics approximately 30% of people all over the world do not go to cafes and restaurants in principle and do not order food cooked there since they are not sure of the quality of prepared dishes and do not trust novel service and delivery systems.

Indeed, the mentioned concerns are justified to a certain extent and cases of poor-quality cooking detection are not unusual, while cases of unfair orders delivery are also met which is caused by the following reasons related to abuses in the professional sphere:

non-compliance with the recipe and cooking technology of any dish;

usage of poor-quality or even dangerous ingredients for dishes cooking, for example, of expired ones;

non-compliance with sanitary and hygienic standards and requirements in dishes cooking and delivery;

violation of delivery modes and features that are specific for certain types of products;

intentional damage to products committed out of hooligan motives.

It should be noted that at present time a wide range of technologies for food cooking and delivery has been developed, the service functionality of which allows one to view on the screen video images of the ordered food cooking and delivery in real time.

So, based on the background of the invention the technology of ready dishes ordering is known (see KR 20110125817).

The technology in KR 20110125817 is implemented via the Internet and represents a system that improves the cooking quality, allowing the user to view the cooking process in real time, usually remotely.

As already mentioned before, according to KR 20110125817 the customer has opportunity to view a video image of cooking the food ordered by a customer, which is actually implemented via the Internet using the required set of software and hardware (control unit, database server, software and client applications, content delivery distribution network, digital video transmission media, reception and playback of digital video information and other equipment), while the seller delivers cooked food to the customer to the designated place.

In engineering terms, the specified procedure for viewing cooking process includes the connection setup stage, the stage of the video broadcast direct viewing as well as the optional stage of the video broadcast saving.

Of the disadvantages of KR 20110125817, it is advisable to note instability, as well as the low speed and security of moving and storing video information, since for data processing and transmission unstable public access communication systems are used, which may not be protected from unauthorized external access, do not have access to software applications with access to continuous digital information. They also do not support competitive communication functionality using security protocols, including cryptographic ones.

The low probability of successful adaptation and practical impossibility of high-performance interaction of the known technology in KR 20110125817 with existing novel and promising portable computer communication devices, since communication capabilities of this system are limited, and the software and hardware features is designed to interact with subsystems of a single-level architecture and certain set of data transfer protocols the interfaces of which are coordinated and regulate the established type and amount of transmitted digital information, should also be noted.

A conventional food cooking and delivery system is known (see KR 102051464). The well-known system in KR 102051464 is related to the technology of permanent video information processing and specifically refers to the field of video monitoring of cooking processes, as well as its delivery to a specific consumer. This food cooking and delivery system in KR 102051464 increases the knowledge of a customer about the cook, about the features and method of the ordered dish cooking and also determines concept of the courier service, including the routes of its movement.

According to the purpose of KR 102051464, the customer of the restaurant has the ability to monitor in real time the processes of cooking and delivery, which allows one to monitor visually the progress of the order, while receiving information that determines the degree of trust in the service provided. In order to implement these technical capabilities, the system uses a public data transmission network, an order management server for receiving and processing requests for cooking and delivery of products, software server and client applications, a point for receiving a request for food delivery coming from the server, user communication equipment and several video cameras located in appropriate places for making pictures of cooking and food delivery stages. In engineering terms, video transmission of the processes of orders cooking and delivery in real time is carried out by activating video cameras through a terminal point for receiving and processing requests, which forms the control signals required for this.

The communication equipment used in the proposed service in KR 102051464 has a flexible architecture focused on interaction with modern and perspective means of communication, software and hardware capable to process non-standard types and large amounts of information moving through secure high-level data transmission channels, which gives the technology great potential and wide application possibilities, but at the same time to support the uninterrupted and successful operation of such technology, in conditions of competitive and constantly growing demand for such services; it will require involvement of a significant amount of energy and labor resources distributed for functional and maintenance of subsystems and equipment, software updates, as well as periodic marketing research aimed at market conjuncture study.

As already mentioned, unconditional and most important advantage of the known technology in KR 102051464 is the prospect of application and processability of use; but still, it should be taken into account that this service is not independent or autonomous during operation and involves direct participation in the work of the person responsible for correct registration of the order, cooking, delivery, as well as for other operations which is inevitable, especially with large volumes, will lead to inaccuracies and failures during orders processing and in conditions of market competition this is highly undesirable since the ratings of the service and as a result the potential circle of consumers may be lowered.

Another food cooking and delivery is known (see KR 20200033408). The known technology in KR 20200033408 refers to a communication system used in the field of nutrition and includes arrangement of cooking and delivery of food and the mentioned processes can be viewed as video signal in real-time format.

The known technology in KR 20200033408 is characterized by formation with the help of a client communication electronic means a food order stored in the software and hardware system used by the contractor, with access for use in administrative and/or system version and implying access to the customer service of the order, the selection of a certain dish from possible for cooking, adding the ordered to the register for approval, specifying, if necessary, the delivery address, choosing the payment method and subsequent completion of the order with the preferred customer information notification regarding the approval of the order, after sending which information about the received order is transmitted to cooking, as a result of which, in the client software application, the possibility of turning on video cameras installed with the ability to broadcast cooking processes in real time is activated; moreover, as the order is ready, the system receives a corresponding signal informing about the readiness of the dish and the need to transfer it to the customer according to the previously determined place of delivery.

Essentially, in the known technology in KR 20200033408, the order is saved in the system with all the data while the order is available both in administrative system and in the restaurant system, then a notification of a new order is received, the order is approved, which the customer is notified about; after that the order is transferred to cooking and video activation occurs in the software application cameras, the client sends a connection request, after which it is established; after the dish is ready the video broadcast is finished and a signal is sent to the delivery service, after that the order is picked up and its status is changed, then the order is delivered and marked as completed. Activation of video cameras recording the work of the cook and the cooking process according to technology in KR 20200033408 is performed using software tools by sending requests to start an online video stream and their approval in case of compliance with the requested authentication code.

The technology in KR 20200033408 has the greatest potential among known analogues, has advanced operating settings and high functional performance, the equipment is adapted for successful interaction with existing and promising communication tools that process large amounts of information; however, it should be pointed out that in terms of processing information flows and accordingly the speed and performance of the system, software logic information processing and implementation of ongoing processes (order receipt, order processing, order approval, on/off of cameras, application setup, order tracking, etc.) is predictable and performed according to programmed cycles, which is not able automatically and without the help of an operator to rebuild and change hardware and software operating modes of equipment to solve non-standard profile tasks, scenario of development and solutions which are not incorporated in the software features.

Also, a significant disadvantage of this technology in KR 20200033408 and similar systems may be certain difficulties in its implementation in the trade and economic systems of various countries, some of which, for security reasons, do not allow the use of client applications operating, for example, via encrypted communication channels, as well as video hosting or other websites whose activities are suspended.

SUMMARY OF THE INVENTION

The technical problem of the proposed invention is creation of a competitive and functional restaurant service with stable operational parameters which allows user monitoring the stages of order fulfillment by watching a video image, thereby increasing the degree of trust in the service provided.

The technical result of the proposed invention, which solves this technical problem, is the implementation of the purpose of creating a restaurant technology that allows the user to remotely, in real time, monitor the processes of cooking and moving dishes and at the same time has high speed, safety and accuracy of information processing, which together increases productivity, creating a reserve taking into account constantly increasing volumes of processed data.

The specified technical result solving the specified technical problem is achieved as a result of the fact that the method of restaurant service implementing accompanied by consumer video monitoring of its execution in real time, includes the formation through a client electronic means of communication of a food order stored in the hardware and software system used by the contractor, with access for use in administrative and/or in the system version and implying access to the customer service of the order, choosing a certain dish from the possible ones for cooking, adding the ordered one to the register for approval, specifying, if necessary, the delivery address, choosing the payment method and subsequent completion of the order with a preferred customer information notification regarding the approval of the order, after sending which information about the received order is transmitted for cooking, at the same time in the client software application it is possible to turn on video cameras installed with ability to broadcast the cooking processes and mainly move dishes in real time, and as the order is ready the system receives a corresponding signal informing about the readiness of the dish and need to transfer it to the customer according to a previously defined place of delivery; at the same time the transition to the execution of received orders is approved by the operator of a software and hardware system containing a cluster of web servers and database servers encapsulating the logic of processes and data storage in a common server of software applications interacting with client software application s, as a result of detecting a signal about the need for order execution, the source data is compared and synchronized with the process of the finished order subsequent delivery, when starting a video broadcast of the cooking process and/or moving a dish in real time, a geographically distributed content delivery and distribution network is used, supporting a software interface application for managing user authentications and access to continuous streams of digital video information; at the same time, software applications of the common server indicate the assigned food order identification number as an input parameter, an authentication code for a geographically distributed network, data transmission and distribution is requested through an appropriate software interface application; in this case, the mentioned authentication code is returned back to the specified software application via a secure cryptographic protocol and the process executed according to the order controlled by the software and hardware system, periodically automatically monitors active information video streams and as the statuses of incoming orders change the database server accesses a geographically distributed network for the delivery and distribution of content for the purpose of possible termination of the broadcast of the provided video content, the functionality and security of which is accompanied by streaming authentication tokens in conjunction with network communication based on cryptographic protocols.

According to the stated inventive concept, one possible object is to create a technological restaurant service that allows the customer to monitor the cooking process and possibly move the dish ordered by him using an electronic means of communication, which is stored in the hardware and software system and supposes access in a remote format via video transmission conducted in real time to the order service, the selection of a certain dish, addition of the ordered one to the register for approval, indication of the place of delivery, choice of the payment method and the subsequent completion of the order, after which the necessary information is transmitted for cooking and at the same time it is possible to turn on video cameras installed with the ability to broadcast the processes of cooking and moving dishes, which is further accompanied by information about the readiness of the order and the need to transfer it to the customer according to a previously determined place of delivery, which in fact is the fundamental basic basis for creating the claimed method of implementing a restaurant service, which should be competitive, capable to provide versatility and flexibility of application; could be successfully adapted to work with large volumes and various formats of digital information, have a certain reserve and competitive potential for promising and successful work surrounded by constantly growing amounts of information that need to be continuously and accurately processed, which is comprehensively required for the purpose of reliable and stable broadcasting in real time of a video image of the progress of a restaurant order with the aim to determine the quality of the service provided and increase trust and, accordingly, increased interest in the cooking service and food delivery.

Implementation of the presented technology with its inherent technical features and differences is possible as a result of the fact that the hardware and software system used contains a cluster of web servers and database servers encapsulating the logic of the processes being performed, and also contains a data storage in a common server of software applications interacting with client software applications; at the same time, due to the detection of a signal about the need for order execution, the source data is compared and synchronized with the process of subsequent delivery of the finished order, which essentially creates a central system cluster with a set of servers connected by high-speed communication channels capable for continuous and high-quality information processing with the possibility of comparing the received data, which minimizes possible errors during data transmission and promotes the adoption of productive specialized decisions that optimally distribute the flow of information and subsequently transmitted to interconnected external services that are part of the project.

When starting a video broadcast of the restaurant order fulfillment process, according to the author's contribution, a geographically distributed content delivery and distribution network is used, which supports a software interface application for managing user authentication and access to digital video information; in this case, the software applications of the central server designate the assigned order identification number as an input parameter, and the authentication code for the said geographically distributed data transmission and distribution network is requested through the software interface application, and the specified authentication code is returned back to the specified software application via a security protocol, which in turn creates the necessary operational conditions under the proposed invention for optimizing and reliability of delivery, as well as distribution of content (video information related to the cooking and movement of dishes) to users (customers), while maintaining high speed and security of data movement due to presence of encrypted communication channels.

Processes to be executed according to orders controlled by a software and hardware system according to a distinctive feature of the embodiment, periodically automatically monitor active video information streams, and as the statuses of incoming orders change, the database server accesses a geographical network for delivery and distribution of content for the purpose of possible termination of the broadcast of the video content provided, the functionality and security of transmission which is accompanied by streaming tokens, authentications together with network communication based on cryptographic protocols, which characterizes this technology in a productive way, providing high indicators of comprehensive security and reliability and in addition to this maintains stability of processing and interception of information video streams since there is an active prevention of delays with exception of communication interruption in operating conditions at elevated network loads.

Thus, the technology presented above for implementation of a restaurant service, taking into account its characteristics and technical features, forms a set of features sufficient to achieve a given technical result, which consists of creating a user service that allows the user remotely, in real time, monitor the processes of cooking and moving dishes and at the same time has high speed and accuracy of information processing, that jointly increases productivity of work, creating a reserve taking into account the constantly increasing volumes of processed data, as well as to solve the specified technical problem of creating a competitive and functional restaurant service with stable operational parameters, allowing the user to monitor the stages of order fulfillment by watching a video image, thereby increasing the degree of trust in the service provided.

Additional features and advantages of the claimed solution are described in the following disclosure and proved by the actual practice of the invention. These advantages and improvements can be achieved by intelligent agents constructed and trained following the claimed method, precisely following the disclosure, along with the accompanying claims and drawings.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF EMBODIMENTS OF THE INVENTION

Figure 1:
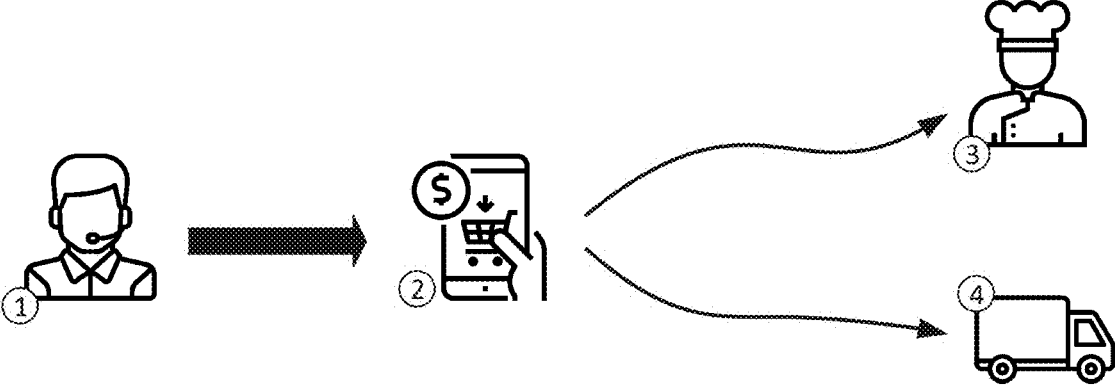
FIG. 1 is schematic of the order approval process.
Figure 2:
FIG. 2 is schematic of the interaction process with a video camera.
Figure 3:
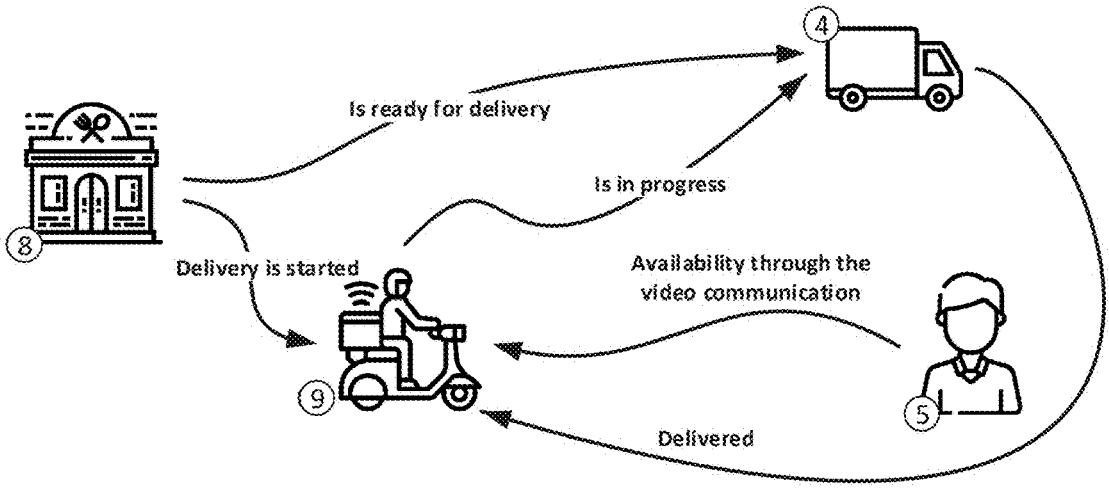
FIG. 3 is schematic of the interaction option of the restaurant with the delivery service.

Reference will now be made in detail to the preferred embodiments of the present invention, examples of which are illustrated in the accompanying drawings.

It should be noted that the purpose of the subsequent description of the proposed invention is not to limit it to a specific implementation option.

The proposed method and system of implementing a restaurant service accompanied by consumer video monitoring of its execution in real time, is explained by specific embodiments examples which, however, are not the only possible ones but clearly demonstrate the achievement of the specified set of essential features of a given technical result, as well as the solution of an existing technical problem.

In FIGS. 1-6 the following components and elements involved in the implementation of the proposed invention are designated as:

1—equipment operator in the restaurant;
2—food order (service);
3—order cooking service;
4—delivery service;
5—a user (customer, client) with a client software application;
6—approved order;
7—video cameras of cooking processes;
8—restaurant;
9—delivery service courier;
10—the service hardware and software system;
11—order option in a remote format;
12—order option directly at the restaurant;
13—geographically distributed data transmission and distribution network;
14—database servers;
15—a user (customer, client) with a client software application making an order in a remote format;
16—a user (customer, client) with a client software application making an order directly at the restaurant.

The proposed restaurant service embodiment accompanied by consumer video monitoring of its execution in real time, can be implemented as follows.

As noted earlier, one key feature of the proposed technology is the ability for a user to observe the process of cooking and delivering the food ordered by them via video link. Technically, this is possible by installing video cameras 7 in a suitable room, for example, in a restaurant 8 where food is being cooked, or, for example, on a courier vehicle 9 of the delivery service 4, and using developed software server applications and client software applications that allow ordering and broadcasting food cooking and delivery processes over public communication channels.

There are two different options for streaming video of the cooking process and delivery of the food order 2 to a customer in real time.

The first option is implemented when the food order 2 is made in a remote format and the second option is when the customer 5 is in close proximity to the place of order cooking, for example, directly in the restaurant 8, while in both cases it is necessary to have a portable electronic means of communication (smartphone, tablet) connected to the Internet and configured a client software application that interacts with web servers of software applications.

In the case of forming a food order 2 in a remote format, then using the client application installed on the smartphone the necessary restaurant 8 is selected, and then the desired dish is selected from the provided list, the desired products are added to the application basket, which are finally approved, then the order is completed and the final wait for programmatic approval of the order is performed. Once the order is approved, the customer 5 will be able to see how the ordered food is prepared using a direct video image coming, for example, from a video camera 7, which is pre-installed and configured in the designated place of the restaurant 8.

In the case of placing a food order 2 directly in the restaurant 8, the smartphone of a customer 5 has the ability through the client software application automatically interact with the web servers of software applications and thereby activate the software capability of connecting a video camera 7 in the interface; since activation of receiving a video image on the user website of the restaurant 8 becomes possible when the smartphone is in the zone a certain radius relative to the installation location of the video camera 7 (the radius is configured by the administrator of the software). In this case, it is also possible to monitor the order cooking process.

At the same time, the following hardware and software components are used as the main means for a continuous video process:

video cameras 7 (IP video cameras) which are installed in the restaurant 8 with the ability to stream digital information;

a hardware and software system 10 containing a cluster of web servers and database servers 14 encapsulating the logic of processes and data storage in a common server of software applications interacting with client software applications;

a video content delivery network with ability to transmit video information in real time, namely a geographically distributed data transmission and distribution network 13, which can be used as a CDN (Content Delivery Network) while this network supports the mode of application programming interfaces, i.e. the principles by which one program interacts with another one, for example, API (Application Programming Interface) which also manage user authentications and access online information flows;

server software applications;

client software application s, i.e., applications for food ordering with ability to provide real-time broadcasts in the form of video content;

video cameras 7 installed with possibility to make images of the order execution processes;

portable electronic means of communication (smart-phone, tablet).

Figure 4:
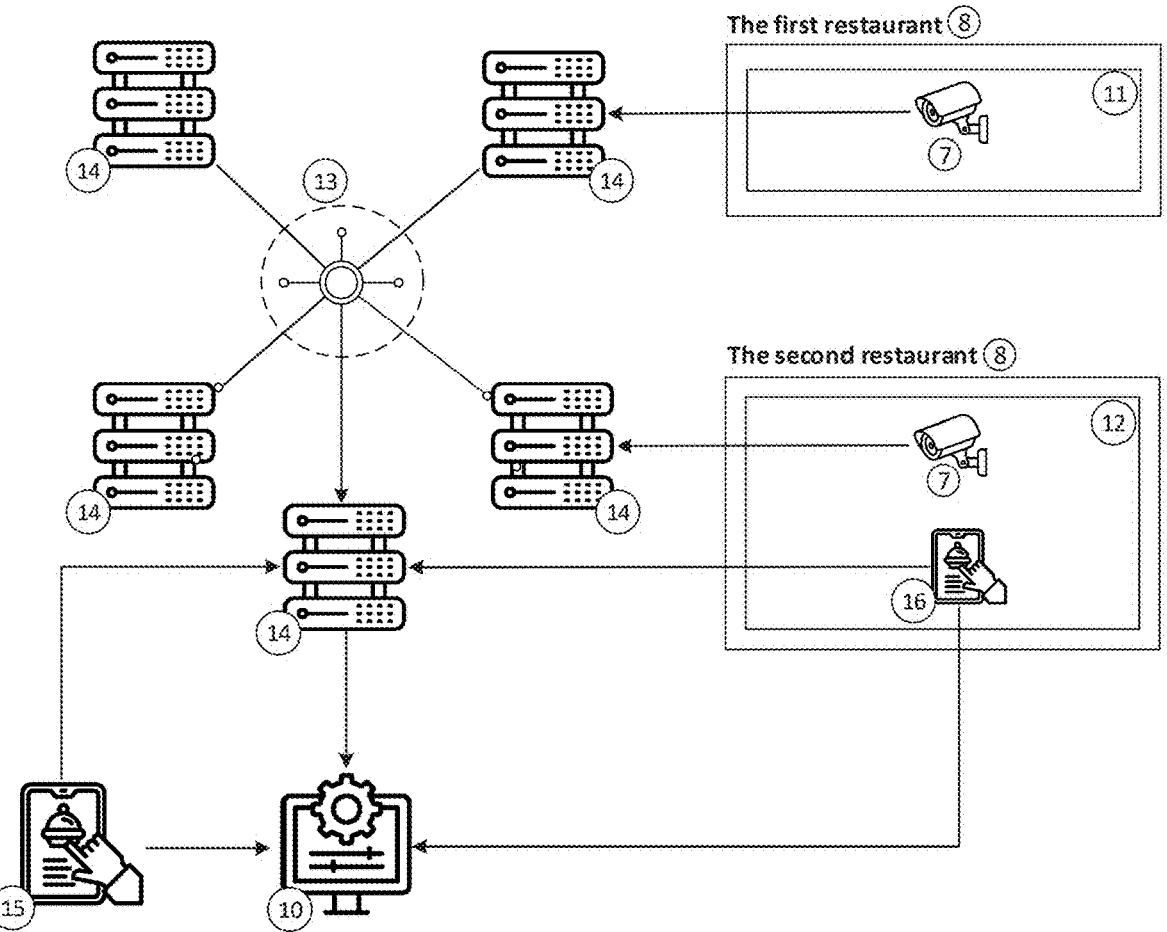
FIG. 4 represents the operation options and the main equipment connections of the proposed restaurant service.

As shown in FIG. 4, video cameras 7 installed in restaurants 8 send a video stream to a geographically distributed data transmission and distribution network 13 via a streaming URL, which is configured in video cameras 7 directly during the installation stages.

An automated programming process is in charge for the automated actions that take place, such as notification management, order status changes, etc.

Figure 5:
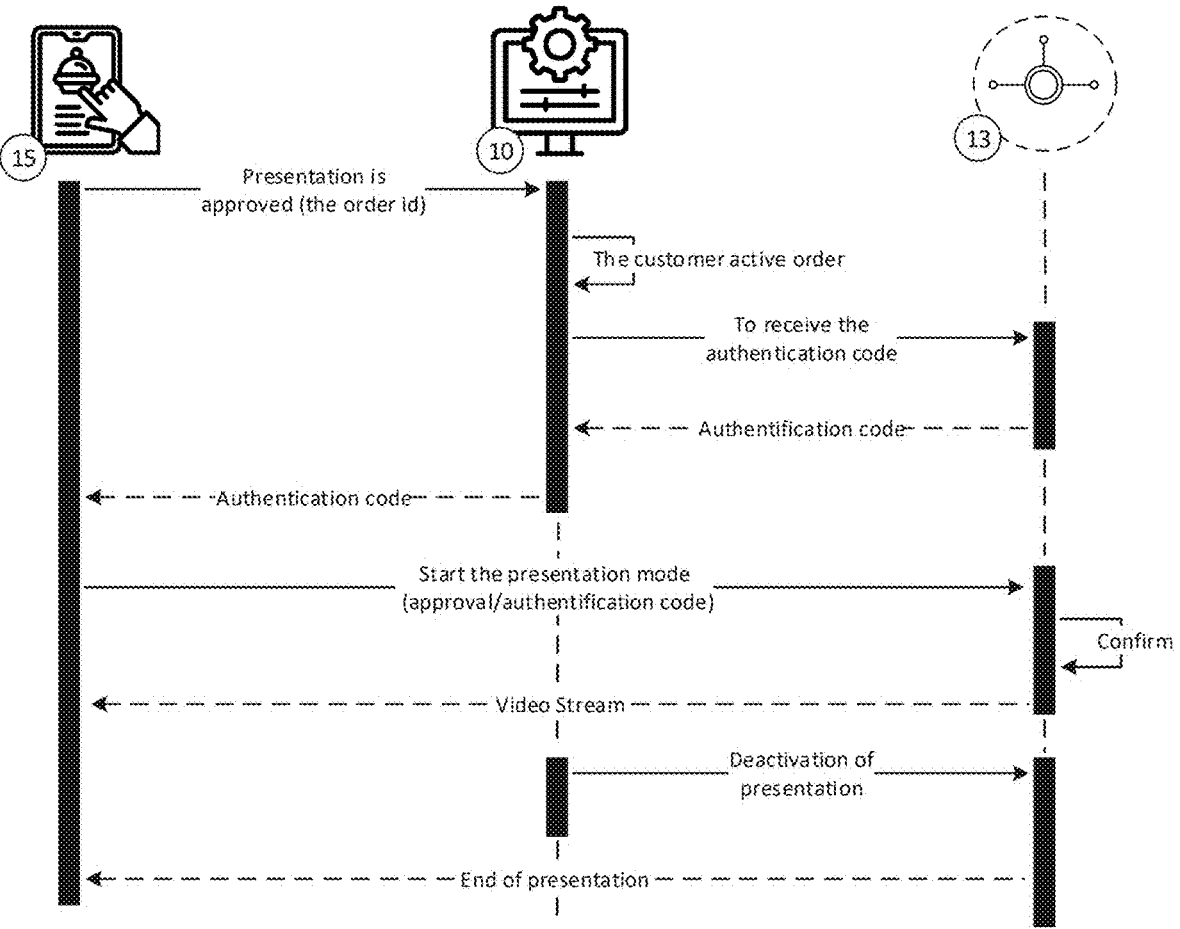
FIG. 5 represents the example of interaction between system equipment to maintain the functionality of video cameras which is necessary for implementation of a restaurant service remote order.
Figure 6:
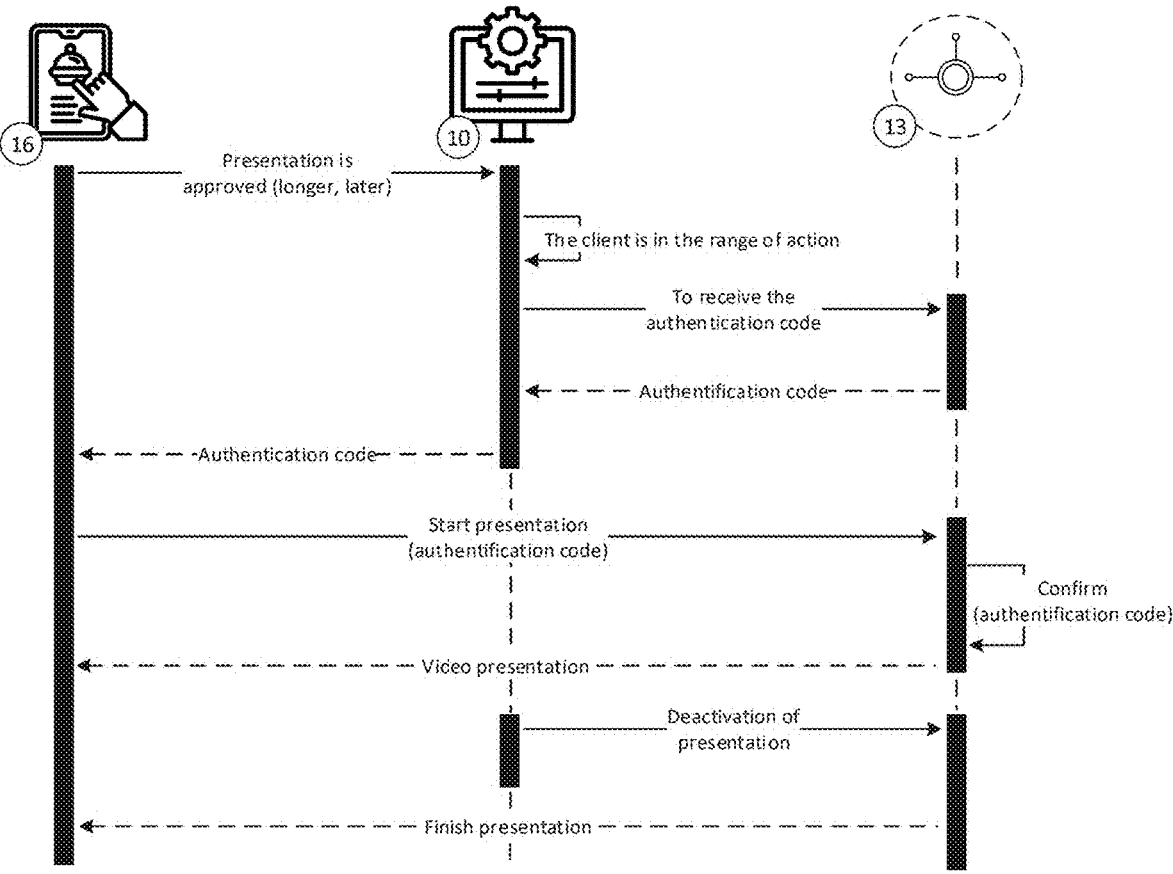
FIG. 6 represents an example of interaction between system equipment to maintain the functionality of video cameras which is necessary for option to order a restaurant service, being in close proximity to the cooking place.

As already indicated, FIG. 5 reflects the interactions between the system equipment to maintain video broadcasting in real time, and the following is an example of the implementation of a restaurant service in a situation of formation of a dedicated restaurant order.

At the same time, description of the processes taking place for this can be formulated as follows:

1. The food order 2 is generated and sent by the user 15, and the client software application sends a request to start video information in real time, specifying the identification number of the food order 2 as an input parameter.

2. The software and hardware system 10 verifies the user 15 and the food order 2. In the case when compliance is established, as well as if the food order 2 is in an active state, a request for data streaming is approved.

3. After that the authentication code is requested for a geographically distributed data transmission and distribution network 13 through the appropriate interface of the software application.

4. The returned authentication code is returned back to the software interface application via the secure cryptographic SSL protocol (Secure Sockets Layer).

5. Then the client software application requests access to a geographically distributed data transmission and distribution network 13 for real-time broadcasting, while providing the received authentication code.

6. A geographically distributed data transmission and distribution network 13 verifies the provided authentication code and only after that provides access to a continuous stream of video information.

7. An ongoing automated process controlled by the hardware and software system 10 periodically monitors active streams of video information, and as soon as the statuses of approved orders 6 change to the "completed" state, the hardware and software system 10 requests access to a geographically distributed data transmission and distribution network 13 to disable the video stream occurring in real time.

8. At the end, the geographically distributed data transmission and distribution network 13 stops the live broadcast of the form of content for this software application and actually for the user 15 who made the order in a remote format.

As noted earlier, FIG. 6 reflects the interactions between the equipment for maintaining video broadcasting in real time and further provides an example of the implementation of a restaurant service in a situation of forming a restaurant service when the user is in close proximity to the cooking place.

At the same time, description of the processes taking place for this can be formulated as follows:

1. The client software application installed on smartphone of the user 16 sends the coordinates (width and longitude) of the physical location of the smartphone to the hardware and software system 10.

2. The hardware and software system 10 checks the location of the portable device, namely the smartphone, checking whether the previously defined coordinates are within the configured radius, and in case of fixing the correspondence a request for transmission of video information in real time is approved.

3. After that the authentication code is requested for a geographically distributed data transmission and distribution network 13 through the appropriate interface of the software application.

4. The returned authentication code is returned back to the software interface application via the secure cryptographic SSL protocol (Secure Sockets Layer).

5. Then the client software application requests access to a geographically distributed data transmission and distribution network 13 for real-time broadcasting, while providing the received authentication code.

6. A geographically distributed data transmission and distribution network 13 verifies the provided authentication code and only after that provides access to a continuous stream of video information.

7. An automated process controlled by the hardware and software system 10 periodically monitors active streams of video information, and as soon as the coordinates of the user 16 are outside the configured range, the hardware and software system requests access to a geographically distributed data transmission and distribution network 13 to disable the video stream taking place in real time.

8. At the end, the geographically distributed data transmission and distribution network 13 stops the live broadcast of the content for this software application and for the user 16 who made the order being directly in the restaurant.

In the described embodiments of the restaurant service, common streaming authentication tokens of a geographically distributed data transmission and distribution network 13 are used to maintain the functionality of video cameras 7, while protection, as such, is controlled by software server and client applications.

A certain safe level of security and reliability of the service is provided through the use of network communications based on cryptographic protocols (communication channels).

It is acceptable to use application programming interfaces provided by a geographically distributed data transmission and distribution network 13 in order to increase access protection to the proposed service.

It is important to note that under this technology it is also possible to monitor the processes of moving finished orders, i.e., the process of their delivery for which video cameras can be installed on vehicles of the delivery service 4, directly located at couriers 9 of the delivery service 4. In order to activate the broadcasting of video content in real time of the processes of finished orders moving to any distance, i.e. their delivery to users 15 and possibly even 16, similar algorithms and modes of restaurant service management presented above are used; however, in this case, the software and hardware system 10 requests access to a geographically distributed data transmission and distribution network 13 to turn off the video stream that occurs in real time not at the stage of completing the cooking of a food order, but at the stage of its final delivery to the customer. In this case, the redirection of video broadcast streams in real time from one video camera to another, which, for example, is used by the delivery service 4, is carried out through a geographically distributed data transmission and distribution network 13 the correctness and operability of which is supported by programmed automated processes controlled by the hardware and software system 10.

Directly in the user mode, the order is formed as follows (see, in particular, FIGS. 1-3):

The food order 2 is formed in the client software application and consists in selecting the dish required for the order which is added to the client application basket, then transition to the web page of the order is done, if necessary, the delivery address is indicated, if required, the delivery method is selected, the payment method is selected and the food order 2 is completed. After that the food order 2 is saved in the service system, as soon as the order is made through the software application, it is saved in the restaurant service system with all data in open mode, while the order information must be available in two systems (in the administrative and in the restaurant system), the operator 1 of a restaurant 8 receives notification of a new food order 2 and also approves it and confirms the order 6 approved by changing the status of the food order to "approved" and sending a positive notification to the customer 5, after which the approved order 6 is transferred to the chief cook (order cooking service 3) with a change in its status to "in the process of cooking", then the order is synchronized with the delivery service 4, which receives notification of a new order.

After the order is approved by the operator 1 of the restaurant 8, it becomes possible to connect video cameras 7 in the interface of the client application, i.e., the option to turn on the video camera 7 is activated, for which the customer sends a connection request after which the connection is established.

After the dish is ready, the order is marked as "ready" and a notification is sent to the delivery service 4, after which the order is picked up and the order status is changed to "in the process of delivery".

If the desire exists, the customer 5 can use the video tracking service of the delivery process, the implementation and functionality of which are indicated in the description above.

In addition to this, the customer 5 can contact the courier 9 of the delivery service 4 and clarify the status of the order.

The operator 1 of the restaurant 8 changes the status of the order to "delivered" after the customer receives it.

Delivery options may be different and include the following varieties:

classic delivery (courier 9 gives the order to the customer personally);

contactless delivery (courier 9 leaves the order near the door);

delivery with waiter service (the order is delivered and the service is carried out with the help of a waiter);

"picnic" delivery (the order is delivered, as well as the all equipment required for the event (table, chairs, chargrill, accessories, etc.)).

As an option, food order 2 can be cancelled. This is done by operator 1, and it is permissible if the order cannot be cooked for any reason. In this case a notification is sent to the user that the order cannot be prepared and it has been assigned the status "canceled by the restaurant service".

The proposed invention shall be applied in the field of information technology, namely in the field of digital communications implemented in restaurant services and the most successfully proposed technology can be used for the remote implementation of consumer orders through handling, incoming and generated management signals implementing the existing programmed features.

The following are notable features of the proposed system:

Integration of Real-time Video Streaming: the system actively manages and processes live video feeds in real-time. The specialized camera setup in the restaurant kitchen interfaces with backend systems to stream content to a distribution network, such as Cloudflare.

Dynamic Security Token Generation: the backend system not just triggers kitchen activity but also dynamically creates security tokens for customers, ensuring that each live feed is securely accessible by the correct customer, which is an improvement in secure multimedia content delivery.

Efficient Resource Management: By creating and invalidating tokens that are aligned with order status, the system efficiently manages computational resources, allowing video access only during the relevant time frame, which is an improvement in the management and allocation of streaming resources.

Real-time access control rigorously verifies token validity through server-side logic, with tokens automatically expiring after order completion or a set duration. Immediate token revocation is activated during scenarios such as order cancellation, with established processes ensuring that revoked tokens are rendered inoperable. Backup systems are in place for handling revocation failures to prevent unauthorized access, maintaining strict security. Regular security audits help protect against vulnerabilities, ensuring the token management system adheres to data protection and privacy regulations, thus safeguarding user information. Furthermore, by creating and invalidating tokens in alignment with the order status, the system efficiently manages computational resources. This process allows video access exclusively during the relevant time frame, significantly improving the management and allocation of streaming resources and enhancing overall system efficiency.

Error Handling and Stream Termination: the system also incorporates a protocol to handle scenarios where signals are not correctly received. The invalidation of access tokens ensures the stream is securely terminated, which is an improvement in ensuring data protection and which minimizes unnecessary network load.

The system also incorporates robust protocols to manage stream continuity and security effectively. If an order is canceled or completed, the system promptly revokes the streaming token, making the stream inaccessible and preventing unauthorized access. The system also sends push notifications to the end users' mobile applications to halt the video stream actively. Additionally, as a fallback mechanism, mobile applications check the stream status every 2 minutes, ensuring no stream remains active beyond its authorized duration. This comprehensive approach, including the invalidation of access tokens, enhances data protection, reduces unnecessary network load, and maintains the integrity and reliability of the streaming service.

A user can use a dedicated app on the user's device (see, e.g, FIGS. 8-9) that interacts with the service provider system. In more detail:

1. User Interface and Interaction: The app provides a user-friendly interface where customers can browse the menu, place orders, and view the live kitchen feed. Once an order is placed, the app updates to show the order status and expected time until the food is ready.

2. Data Exchange with the Server:

Order Placement: When a customer selects their dishes and completes the order, the app sends this data to the backend servers. This includes the menu selections, quantities, customer details, and payment information.

Receiving Order Confirmation: The server processes the order and sends back a confirmation to the app with a unique order ID and estimated preparation time.

3. Notification Mechanism:

Push Notifications: The app uses push notifications to alert the user about the status of their order. This includes when the order is accepted in the kitchen, when the food starts being prepared, and when it's ready for pickup or out for delivery.

Live Updates: As the order progresses, the app receives updates from the server, which are displayed to the user. This helps keep the customer informed of the exact status of their meal.

4. Live Video Stream:

Activation of the Stream: Upon order acceptance, the server generates a security token and passes it to the app, which uses this token to access the live stream from the kitchen cameras. This ensures that only authorized users can view the video.

Stream Monitoring: The app continuously monitors the stream's status and adjusts the display based on the streaming data received. If the stream is interrupted or ends, the app responds accordingly by displaying a notification or closing the stream window.

5. End of the Video Stream:

Stream Termination: When the kitchen marks the order as complete, the server sends a signal to the app to terminate the video stream. Concurrently, the server invalidates the security token to ensure that the stream cannot be accessed after the order is completed.

6. Security and Privacy:

Secure Data Transmission: All data exchanged between the app and the servers, including personal and payment information, is encrypted using SSL/TLS protocols to ensure security and privacy.

Authentication: User authentication is managed through secure login mechanisms, ensuring that access is granted only to authenticated users.

Quality control system. The system can automatically monitor the compliance of the ordered dish by comparing it with the database (pictures) of the sample. If the sample does not correspond, a notification is automatically sent to the manager to make a decision to send the order to the customer or redo the order.

System for monitoring sanitary and hygienic standards. The system can automatically monitor the cleanliness and order of the food preparation area: the system can notify about products left on the desktop after completing an order (excluding spoilage of perishable products); notify the cook about the lack of gloves or the sweaty face, notify if the cook has picked up fallen food or utensils from the floor and placed them on the work surface.

This comprehensive app functionality not only enhances customer satisfaction by providing transparency and real-time updates but also incorporates technical solutions that manage, secure, and optimize data and resource usage effectively.

Thus, these technical implementations demonstrate how the system significantly improves upon existing technological processes, enhancing the functionality of hardware (via specialized cameras and streaming), network functions (through efficient data transmission to a distribution network, such as Cloudflare), and computational resources (utilizing dynamic token generation and secure URL distribution). These technical enhancements improve system security, efficiency, and resource management.

The presented restaurant service is also able to increase consumer interest in food delivery services, as well as to increase the degree of trust in such services, which will increase sales and raise the profits.

Figure 7:
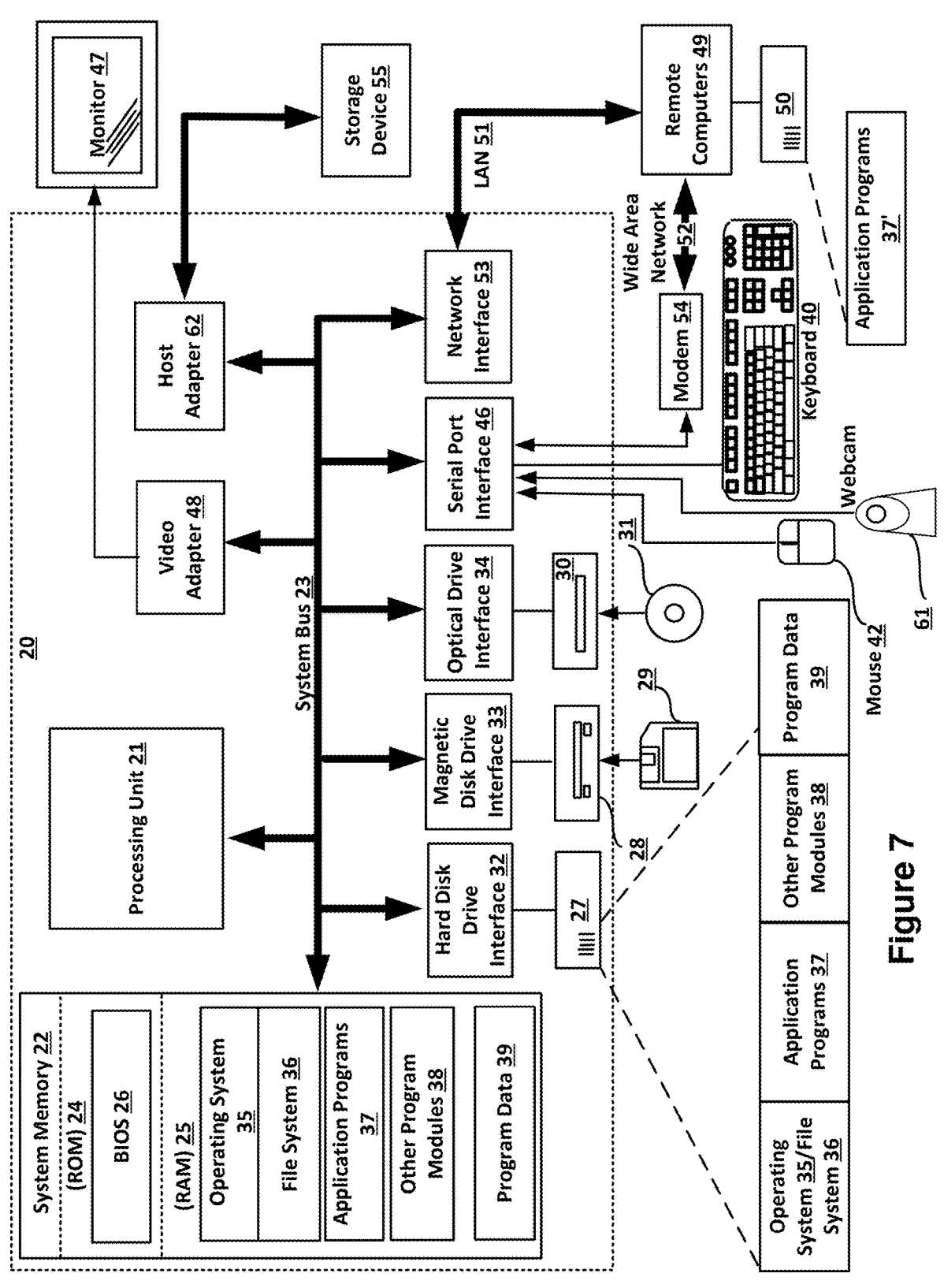
FIG. 7 shows an exemplary system for implementing the invention, including a general purpose computing device in the form of a host computer or a server.

With reference to FIG. 7, an exemplary system for implementing the invention includes a general purpose computing device in the form of a host computer or a server 20 or the like, including a processing unit (CPU) 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes a read-only memory (ROM) 24 and random access memory (RAM) 25. A basic input/output system 26 (BIOS), containing the basic routines that help to transfer information between the elements within the computer 20, such as during start-up, is stored in ROM 24.

The computer or server 20 may further include a hard disk drive 27 for reading from and writing to a hard disk, not shown herein, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively.

The drives and their associated computer-readable media provide non-volatile storage of computer readable instructions, data structures, program modules and other data for the server 20. Although the exemplary environment described herein employs a hard disk (storage device 55), a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk (storage device 55), magnetic disk 29, optical disk 31, ROM 24 or RAM 25, including an operating system 35 (e.g., MICROSOFT WINDOWS, LINUX, APPLE OS X or similar). The server/computer 20 includes a file system 36 associated with or included within the operating system 35, such as the Windows NT™ File System (NTFS) or similar, one or more application programs 37, other program modules 38 and program data 39. A user may enter commands and information into the server 20 through input devices such as a keyboard 40, a webcam 61 and pointing device (e.g., a mouse) 42.

Other input devices (not shown) may include a microphone, joystick, game pad, satellite dish, scanner or the like. These and other input devices are often connected to the processing unit 21 through a serial port interface 46 that is coupled to the system bus, and they may also be connected by other interfaces, such as a parallel port, game port or universal serial bus (USB). A monitor 47 or other type of display device is also connected to the system bus 23 via an interface, such as a video adapter 48. In addition to the monitor 47, computers typically include other peripheral output devices (not shown), such as speakers and printers. A host adapter 62 is used to connect to the storage device 55.

The server/computer 20 may operate in a networked environment using logical connections to one or more remote computers 49. The remote computer (or computers) 49 may be another personal computer, a server, a router, a network PC, a peer device or other common network node, and it typically includes some or all of the elements described above relative to the server 20, although here only a memory storage device 50 with application software 37' is illustrated. The logical connections include a local area network (LAN) 51 and a wide area network (WAN) 52. Such networking environments are common in offices, enterprise-wide computer networks, Intranets and the Internet.

In a LAN environment, the server/computer 20 is connected to the local network 51 through a network interface or adapter 53. When used in a WAN networking environment, the server 20 typically includes a modem 54 or other means for establishing communications over the wide area network 52, such as the Internet.

The modem 54, which may be internal or external, is connected to the system bus 23 via the serial port interface 46. In a networked environment, the program modules depicted relative to the computer or server 20, or portions thereof, may be stored in the remote memory storage device. It will be appreciated that the network connections shown are merely exemplary and other means of establishing a communications link between the computers may be used.

Figure 8:
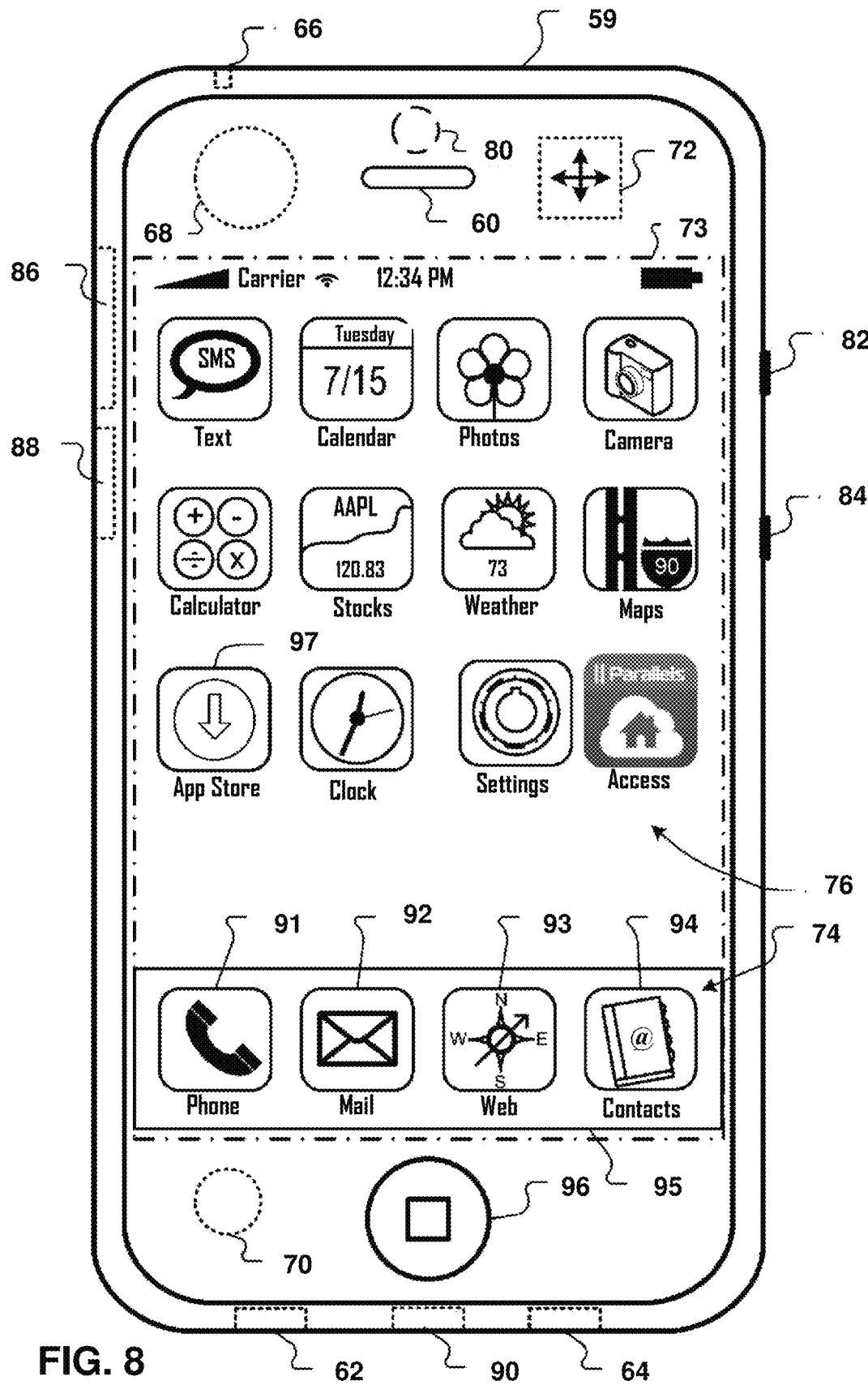
FIG. 8 is a block diagram of an exemplary mobile device that can be used in the invention.

FIG. 8 is a block diagram of an exemplary mobile device 59 on which the invention can be implemented. The mobile device 59 can be, for example, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices.

In some implementations, the mobile device 59 includes a touch-sensitive display 73. The touch-sensitive display 73 can implement liquid crystal display (LCD) technology, light emitting polymer display (LPD) technology, or some other display technology. The touch-sensitive display 73 can be sensitive to haptic and/or tactile contact with a user.

In some implementations, the touch-sensitive display 73 can comprise a multi-touch-sensitive display 73. A multi-touch-sensitive display 73 can, for example, process multiple simultaneous touch points, including processing data related to the pressure, degree and/or position of each touch point. Such processing facilitates gestures and interactions with multiple fingers, chording, and other interactions. Other touch-sensitive display technologies can also be used, e.g., a display in which contact is made using a stylus or other pointing device.

In some implementations, the mobile device 59 can display one or more graphical user interfaces on the touch-sensitive display 73 for providing the user access to various system objects and for conveying information to the user. In some implementations, the graphical user interface can include one or more display objects 74, 76. In the example shown, the display objects 74, 76, are graphic representations of system objects. Some examples of system objects include device functions, applications, windows, files, alerts, events, or other identifiable system objects.

In some implementations, the mobile device 59 can implement multiple device functionalities, such as a telephony device, as indicated by a phone object 91; an e-mail device, as indicated by the c-mail object 92; a network data communication device, as indicated by the Web object 93; a Wi-Fi base station device (not shown); and a media processing device, as indicated by the media player object 94. In some implementations, particular display objects 74, e.g., the phone object 91, the e-mail object 92, the Web object 93, and the media player object 94, can be displayed in a menu bar 95. In some implementations, device functionalities can be accessed from a top-level graphical user interface, such as the graphical user interface illustrated in the figure. Touching one of the objects 91, 92, 93 or 94 can, for example, invoke corresponding functionality.

In some implementations, the mobile device 59 can implement network distribution functionality. For example, the functionality can enable the user to take the mobile device 59 and its associated network while traveling. In particular, the mobile device 59 can extend Internet access (e.g., Wi-Fi) to other wireless devices in the vicinity. For example, mobile device 59 can be configured as a base station for one or more devices. As such, mobile device 59 can grant or deny network access to other wireless devices.

In some implementations, upon invocation of device functionality, the graphical user interface of the mobile device 59 changes, or is augmented or replaced with another user interface or user interface elements, to facilitate user access to particular functions associated with the corresponding device functionality. For example, in response to a user touching the phone object 91, the graphical user interface of the touch-sensitive display 73 may present display objects related to various phone functions; likewise, touching of the email object 92 may cause the graphical user interface to present display objects related to various e-mail functions; touching the Web object 93 may cause the graphical user interface to present display objects related to various Web-surfing functions; and touching the media player object 94 may cause the graphical user interface to present display objects related to various media processing functions.

In some implementations, the top-level graphical user interface environment or state can be restored by pressing a button 96 located near the bottom of the mobile device 59. In some implementations, each corresponding device functionality may have corresponding "home" display objects displayed on the touch-sensitive display 73, and the graphical user interface environment can be restored by pressing the "home" display object.

In some implementations, the top-level graphical user interface can include additional display objects 76, such as a short messaging service (SMS) object, a calendar object, a photos object, a camera object, a calculator object, a stocks object, a weather object, a maps object, a notes object, a clock object, an address book object, a settings object, and an app store object 97. Touching the SMS display object can, for example, invoke an SMS messaging environment and supporting functionality; likewise, each selection of a display object can invoke a corresponding object environment and functionality.

Additional and/or different display objects can also be displayed in the graphical user interface. For example, if the device 59 is functioning as a base station for other devices, one or more "connection" objects may appear in the graphical user interface to indicate the connection. In some implementations, the display objects 76 can be configured by a user, e.g., a user may specify which display objects 76 are displayed, and/or may download additional applications or other software that provides other functionalities and corresponding display objects.

In some implementations, the mobile device 59 can include one or more input/output (I/O) devices and/or sensor devices. For example, a speaker 60 and a microphone 62 can be included to facilitate voice-enabled functionalities, such as phone and voice mail functions. In some implementations, an up/down button 84 for volume control of the speaker 60 and the microphone 62 can be included. The mobile device 59 can also include an on/off button 82 for a ring indicator of incoming phone calls. In some implementations, a loud speaker 64 can be included to facilitate hands-free voice functionalities, such as speaker phone functions. An audio jack 66 can also be included for use of headphones and/or a microphone.

In some implementations, a proximity sensor 68 can be included to facilitate the detection of the user positioning the mobile device 59 proximate to the user's car and, in response, to disengage the touch-sensitive display 73 to prevent accidental function invocations. In some implementations, the touch-sensitive display 73 can be turned off to conserve additional power when the mobile device 59 is proximate to the user's car.

Other sensors can also be used. For example, in some implementations, an ambient light sensor 70 can be utilized to facilitate adjusting the brightness of the touch-sensitive display 73. In some implementations, an accelerometer 72 can be utilized to detect movement of the mobile device 59, as indicated by the directional arrows. Accordingly, display objects and/or media can be presented according to a detected orientation, e.g., portrait or landscape. In some implementations, the mobile device 59 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 59 or provided as a separate device that can be coupled to the mobile device 59 through an interface (e.g., port device 90) to provide access to location-based services.

The mobile device 59 can also include a camera lens and sensor 80. In some implementations, the camera lens and sensor 80 can be located on the back surface of the mobile device 59. The camera can capture still images and/or video.

The mobile device 59 can also include one or more wireless communication subsystems, such as an 802.11b/g communication device 86, and/or a BLUETOOTH communication device 88. Other communication protocols can also be supported, including other 802.x communication protocols (e.g., WiMax, Wi-Fi, 3G, LTE), code division multiple access (CDMA), global system for mobile communications (GSM), Enhanced Data GSM Environment (EDGE), etc.

In some implementations, the port device 90, e.g., a Universal Serial Bus (USB) port, or a docking port, or some other wired port connection, is included. The port device 90 can, for example, be utilized to establish a wired connection to other computing devices, such as other communication devices 59, network access devices, a personal computer, a printer, or other processing devices capable of receiving and/or transmitting data. In some implementations, the port device 90 allows the mobile device 59 to synchronize with a host device using one or more protocols, such as, for example, the TCP/IP, HTTP, UDP and any other known protocol. In some implementations, a TCP/IP over USB protocol can be used.

Figure 9:
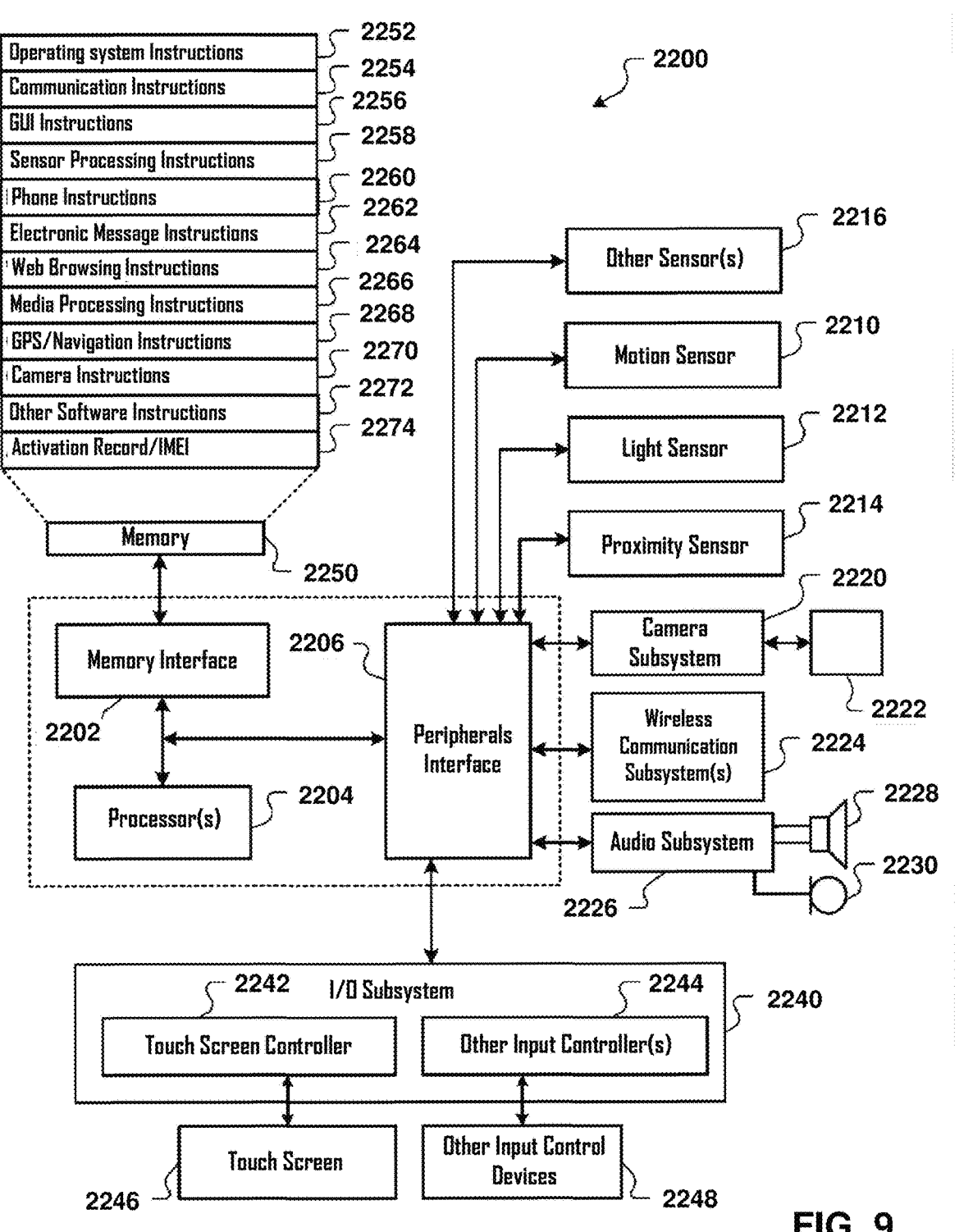
FIG. 9 is a block diagram of an exemplary implementation of the mobile device.

FIG. 9 is a block diagram 2200 of an example implementation of the mobile device 59. The mobile device 59 can include a memory interface 2202, one or more data processors, image processors and/or central processing units 2204, and a peripherals interface 2206. The memory interface 2202, the one or more processors 2204 and/or the peripherals interface 2206 can be separate components or can be integrated in one or more integrated circuits. The various components in the mobile device 59 can be coupled by one or more communication buses or signal lines.

Sensors, devices and subsystems can be coupled to the peripherals interface 2206 to facilitate multiple functionalities. For example, a motion sensor 2210, a light sensor 2212, and a proximity sensor 2214 can be coupled to the peripherals interface 2206 to facilitate the orientation, lighting and proximity functions described above. Other sensors 2216 can also be connected to the peripherals interface 2206, such as a positioning system (e.g., GPS receiver), a temperature sensor, a biometric sensor, or other sensing device, to facilitate related functionalities.

A camera subsystem 2220 and an optical sensor 2222, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 2224, which can include radio frequency receivers and transmitters and/or optical (e.g., infrared) receivers and transmitters. The specific design and implementation of the communication subsystem 2224 can depend on the communication network(s) over which the mobile device 59 is intended to operate. For example, a mobile device 59 may include communication subsystems 2224 designed to operate over a GSM network, a GPRS network, an EDGE network, a Wi-Fi or WiMax network, and a BLUETOOTH network. In particular, the wireless communication subsystems 2224 may include hosting protocols such that the device 59 may be configured as a base station for other wireless devices.

An audio subsystem 2226 can be coupled to a speaker 2228 and a microphone 2230 to facilitate voice-enabled functions, such as voice recognition, voice replication, digital recording, and telephony functions.

The I/O subsystem 2240 can include a touch screen controller 2242 and/or other input controller(s) 2244. The touch-screen controller 2242 can be coupled to a touch screen 2246. The touch screen 2246 and touch screen controller 2242 can, for example, detect contact and movement or break thereof using any of multiple touch sensitivity technologies, including but not limited to capacitive, resistive, infrared, and surface acoustic wave technologies, as well as other proximity sensor arrays or other elements for determining one or more points of contact with the touch screen 2246.

The other input controller(s) 2244 can be coupled to other input/control devices 2248, such as one or more buttons, rocker switches, thumb-wheel, infrared port, USB port, and/or a pointer device such as a stylus. The one or more buttons (not shown) can include an up/down button for volume control of the speaker 2228 and/or the microphone 2230.

In one implementation, a pressing of the button for a first duration may disengage a lock of the touch screen 2246; and a pressing of the button for a second duration that is longer than the first duration may turn power to the mobile device 59 on or off. The user may be able to customize a functionality of one or more of the buttons. The touch screen 2246 can, for example, also be used to implement virtual or soft buttons and/or a keyboard.

In some implementations, the mobile device 59 can present recorded audio and/or video files, such as MP3, AAC, and MPEG files. In some implementations, the mobile device 59 can include the functionality of an MP3 player. The mobile device 59 may, therefore, include a 32-pin connector that is compatible with the MP3 player. Other input/output and control devices can also be used.

The memory interface 2202 can be coupled to memory 2250. The memory 2250 can include high-speed random access memory and/or non-volatile memory, such as one or more magnetic disk storage devices, one or more optical storage devices, and/or flash memory (e.g., NAND, NOR). The memory 2250 can store an operating system 2252, such as Darwin, RTXC, LINUX, UNIX, OS X, ANDROID, IOS, WINDOWS, or an embedded operating system such as VxWorks. The operating system 2252 may include instructions for handling basic system services and for performing hardware dependent tasks. In some implementations, the operating system 2252 can be a kernel (e.g., UNIX kernel).

The memory 2250 may also store communication instructions 2254 to facilitate communicating with one or more additional devices, one or more computers and/or one or more servers. The memory 2250 may include graphical user interface instructions 2256 to facilitate graphic user interface processing including presentation, navigation, and selection within an application store; sensor processing instructions 2258 to facilitate sensor-related processing and functions; phone instructions 2260 to facilitate phone-related processes and functions; electronic messaging instructions 2262 to facilitate electronic-messaging related processes and functions; web browsing instructions 2264 to facilitate web browsing-related processes and functions; media processing instructions 2266 to facilitate media processing-related processes and functions; GPS/Navigation instructions 2268 to facilitate GPS and navigation-related processes and instructions; camera instructions 2270 to facilitate camera-related processes and functions; and/or other software instructions 2272 to facilitate other processes and functions.

Each of the above identified instructions and applications can correspond to a set of instructions for performing one or more functions described above. These instructions need not be implemented as separate software programs, procedures or modules. The memory 2250 can include additional instructions or fewer instructions. Furthermore, various functions of the mobile device 59 may be implemented in hardware and/or in software, including in one or more signal processing and/or application specific integrated circuits.

It should also be appreciated that various modifications, adaptations, and alternative embodiments thereof may be made within the scope and spirit of the present invention. The invention is further defined by the following claims.

What is claimed is:

1. A method of restaurant service, comprising:
   a) receiving, through a client electronic device, a food order and storing the food order in a data register of a service provider system;
   b) receiving a selection of a menu item from an electronic menu and confirming the food order for preparation;
   c) transmitting the food order details to a kitchen display system that manages order workflow;
   d) generating a unique identifier for the food order and providing a secure, time-limited access token to the client electronic device for initiating a live video stream of food preparation via a geographically distributed content delivery network (CDN);

e) activating cameras within the kitchen to capture the food preparation, wherein the cameras are operatively connected to the CDN;
   f) receiving a readiness signal from the kitchen display system upon completion of the food order and initiating delivery of the food order to an address provided by the client electronic device;
   g) synchronizing the readiness signal with the service provider system to facilitate packaging and dispatch of the food order for delivery;
   h) utilizing the CDN to manage user authentication and access to the live video stream, wherein the CDN interfaces with the service provider system to validate the access token; and
   i) upon completion of the order, automatically instructing a database server within the service provider system to terminate the video stream, and deactivating the access token, wherein the access token is deactivated via a cryptographic protocol.

2. The system of claim 1, wherein steps (a) through (g) are performed in real time.

3. The system of claim 1, wherein the system gives a user an ability to observe the food preparation.

4. The system of claim 1, wherein the system gives a user an ability to observe the delivery of the food order.

5. The system of claim 1, further comprising a client application installed on a smartphone, and, once the food order is selected from a provided list, preparation of the food order is displayed on the smartphone using a direct video link.

6. The system of claim 5, wherein the client application displays a video feed from a video camera in a kitchen where the food order is being prepared.

7. The system of claim 6, wherein, once the food order is completed, the video feed is disabled.

8. The system of claim 6, wherein the system monitors compliance of the food order by comparing the food order from the video feed with images in a database.

9. The system of claim 6, wherein the system monitors cleanliness of the kitchen using the video feed.

10. The system of claim 5, wherein the video feed is accessed via a URL (universal resource locator).

11. The system of claim 5, wherein the video feed is disabled when the smartphone moves outside a predefined geographic range.

12. The system of claim 5, wherein the client application uses an API (Application Programming Interface) to manage the user authentication.

13. The system of claim 5, wherein the client application receives an order ID and an estimated preparation time for the food order.

14. The system of claim 5, wherein the client application uses an API (Application Programming Interface) to manage user access to online information flows relating to the food order.

15. The system of claim 1, wherein each food order has its own identification as an input parameter of the system.

16. The system of claim 1, wherein the user authentication code is enabled via a secure cryptographic SSL (Secure Sockets Layer) protocol.

17. The system of claim 1, wherein the access token is canceled for any food order that is canceled.

\*   \*   \*   \*   \*